Patented June 29, 1937

2,085,178

UNITED STATES PATENT OFFICE 2,085,178

PROCESS FOR SLUDGE TREATMENT

Marshall F. Acken, Woodbury, N. J., assignor to E. I. du Pont de Nemours & Company, Wilmington, Del., a corporation of Delaware No Drawing. Application January 22, 1936, Serial No. 60,358

15 Claims. (Cl. 75—33)

The present invention relates to a new and useful process for the treatment of sludge. It has particular application to the recovery of iron from a sludge containing that metal in a combined form.

The art is familiar with the use of iron borings, for example in the preparation of aniline by the reduction of nitrobenzene in acid solution, or in the presence of a reduction catalyst and water. Many other form of scrap iron such as filings and punchings have been used for this purpose. In the course of the reaction such material is converted into a sludge. The term "sludge" used in this specification, and in the claims annexed hereto, is intended to mean; a material produced in the reduction of organic compounds by means of a metal or metals, characterized by its extremely finely divided state, and by the fact that it is comprised largely of the oxides of the metal used.

Heretofore such sludge was discarded as it was formed, a fresh charge of iron being used in each operation. This condition is undesirable from the standpoint of the efficiency of such reductions. Further, scrap iron is not a uniformly excellent reagent. Due to wide variations in chemical composition and physical state, such material does not lend itself to close chemical control. The actual iron content varies widely, and, at times, a large quantity of impurities are present which greatly reduce the efficiency of the process.

In view of these disadvantages, it is highly desirable to recover the sludge iron, and, in particular, to recover it in a reactive state, that is, with an extended surface in relation to its mass. By such a procedure, a single charge of iron could be used many times in a cyclic process by recovering it from the sludge after each operation. Indeed, because of its highly reactive nature, the recovered ferriferous material is ordinarily a better reagent than the scrap iron from which it was produced.

Heretofore, many difficulties stood in the way of a satisfactory recovery of sludge iron in such a preferred form. In the first place, the sludge is characteristically very finely divided, which renders it difficult to handle, due to dusting. A kiln process was heretofore not satisfactory for reduction of sludge, since the iron produced was so finely divided that it was carried out of the stack as a fine dust which would not settle in the dust chambers As high as 20% of iron thus produced was lost in this way. Another difficulty arising from the fineness of the sludge was that the ferriferous material prepared therefrom was in turn so finely divided that it showed a marked tendency to reoxidize shortly after reduction.

An additional difficulty with the commercial recovery of the iron in such a preferred state lies in the fact that the reduction of the sludge must be carried out at a temperature below the melting point of the iron, to prevent fusion, for, with fusion, the material no longer presents an extended surface in relation to its mass. Consequently, such fused material is relatively non-reactant, and undesirable. Yet if a low temperature is maintained, to avoid any such fusion, it is known that the more available reducing agents fail to give a substantial reduction of the sludge. For example, when anthracite coal is used to reduce sludge at temperatures below the melting point of iron, by methods well known in the art, less than 50% reduction is accomplished.

The present invention has for its object the new and useful process comprising the substantially complete recovery of the iron from a sludge containing combined iron. A further object is the process for recovering such iron in a preferred state in the form of a material with a high surface area. Other objects will be apparent as the details of the invention are hereinafter disclosed.

The foregoing objects are accomplished by my invention, whereby a sludge containing combined iron, preferably in the form of iron oxides, is converted into a desirable ferriferous material, which possesses a large surface area in relation to its mass. This transformation is accomplished in two principal stages, namely, a sintering stage and a reducing stage. The sintering stage is important in view of the difficulties due to the fineness of the sludge as mentioned above. Sintering consists in moistening the sludge and heating it at a temperature high enough to cause the sludge particles to fuse together into somewhat larger lumps, at the same time driving off any volatile matter present. I prefer to add during this sintering stage a material which serves as a catalyst in the subsequent reduction step.

The lumps formed are easily crushed to the size suitable for reduction. In this way, I have avoided any dusting such as is found in handling either the unsintered sludge or the reduction product thereof. Likewise, the ferriferous material produced on reducing the sintered sludge will be in such a state that immediate re-oxidation will not occur A typical sintering operation is described below.

Example 1

A suitable amount of the finely divided sludge was moistened with enough water to render it cohesive. Thirty pounds of this moistened sludge was placed in a rotary kiln preheated to 1120° C., and the heating was continued. When the temperature had climbed to 1000° C., ¼ pound of salt, of screen size —8, was added and thoroughly incorporated with the sludge. Thirty pounds more sludge was added and then ¼ pound more salt. This was repeated until a total of 125 pounds of wet sludge and one pound of salt had been added. The charge was then heated to 1100° C., and discharged. The total time consumed in the entire sintering process was one hour and fifty minutes. The resulting product weighed 50 pounds and consisted of an intimate mixture of the sintered sludge and catalyst, in the form of igneous agglomerates which were then crushed to a screen size of —20 +100.

Although the above process is a suitable one, I do not wish to limit myself to the details given therein, for many variations may be made without departing from the spirit of the invention. The temperature to be used in sintering will depend upon the nature of the material which is to be treated. An optimum temperature range for sintering aniline sludge, for example, is from 1050 to 1150° C. Any suitable apparatus may be used for the process. Thus, for example, although a rotary kiln was employed in the foregoing example, an electric muffle furnace may be used if desired. Again, the length of the sintering period will depend upon the nature of the sludge to be treated and also on the type of apparatus used. Although the addition of a catalyst during the sintering step is preferable, a substantial advance over the art is attained even by the addition of all the catalyst during the reduction operation.

After the sludge has been thoroughly sintered, it is ready for the reduction stage. As stated above, the reduction of ferriferous sludge to the desired ferriferous material is not satisfactory with the most available reducing agents. A very incomplete reduction is generally obtained therefrom without heating at least part of the metal above its melting point, causing fusion and a non-reactive, undesirable product, which does not possess an extended surface with relation to its mass.

I have discovered that even where the readily available reducing agents such as anthracite coal are employed, by using a suitable catalyst, I may obtain a practically complete reduction of sintered ferriferous sludge to form a ferriferous material with extended surface in relation to its mass; that is, without employing temperatures exceeding the melting point of iron (1275° C.).

According to my invention, the catalyst comprises a derivative of a metal of the alkali and alkaline earth groups, the oxides, carbonates, chlorides and hydroxides thereof, being particularly satisfactory. Because of their ready availability, I prefer to employ sodium hydroxide, sodium carbonate, sodium chloride, or any mixtures thereof. For example, when anthracite coal is used as the reducing agent, I employ rock salt as a catalyst and obtain a metallization of over 97%. Treatment in the absence of a catalyst gives a reduction of less than 50%.

The following examples will enable the skilled artisan to understand and make use of my invention for reducing sintered sludge with a reducing agent and a catalyst to give a preferred product:

Example 2

From a mass of the mixture of aniline sludge and catalyst, sintered and crushed as in Example 1, a charge of 24 pounds thereof was mixed with 12 pounds of anthracite coal of screen size —20 +100. This charge was placed in a rotary kiln after mixing therewith ½ pound of additional salt catalyst. The kiln was heated to 875° C. and rotated at 1¼ revolutions per minute for a period of one and one-half hours, the charge therein being in direct contact with the hot gaseous products of combustion generated in the fuel compartment of the kiln, along with those gases generated from the combustion of coal within the charge itself. At the end of the reduction period, the charge was removed from the kiln and cooled out of contact with air, to prevent material reoxidation. After cooling, the reduced sludge was separated from the residue of coal and ash by passing the mixture near an electro-magnet so that the ferriferous material was drawn out. A metallization of 90.5% was obtained. The ferriferous product exhibited a high surface area in relation to its mass and was a very effective reduction material.

The advantage of introducing the catalyst into the sludge during the sintering stage, instead of during reduction, is illustrated by a comparison of the results in the following examples.

Example 3

A charge comprising 20 pounds of sludge, of screen size —20 +100, sintered without the addition of salt; 15 pounds of anthracite coal, of screen size —20 +100; and one pound of rock salt of screen size —8 was treated by the method of Example 2. The metallization was only 43.5%.

Example 4

A charge comprising 20 pounds of sludge of screen size —20 +100, sintered as in Example 1 with the addition of salt; 15 pounds anthracite coal of screen size —20 +100; and ⅛ pound of rock salt of screen size —8 was treated by the method of Example 2. The metallization was 91.7%.

From the foregoing example the advantage of adding the catalyst, before the sintering operation, is apparent since the metallization yields are increased from 43.5 to 91.7%. The importance of the catalyst in the reduction stage is shown in Example 5.

Example 5

A charge of 79 grams of aniline sludge, sintered without the addition of the catalyst, and crushed to a screen size of —8 +20, was thoroughly mixed with 31.6 grams of the same anthracite coal as used in Example 4. No catalyst was employed. The metallization was only 32.7%.

From this example it is apparent that even the late addition of all the catalyst during the reduction stage gives a better result than that obtained when no catalyst whatsover is employed.

In the foregoing processes according to my invention, a substantial reduction was obtained in each case. However, a still higher degree of reduction may be attained by carrying out the reduction out of contact with the air. This may be done even though all of the catalyst is added during the reduction stage. The details of this alternative procedure are shown in Examples 6 and 7.

*Example 6*

A suitable amount of finely divided sludge is moistened with enough water to render it cohesive. Briquettes of the wet sludge were placed in a standard electric muffle furnace, and heated for one hour at a temperature of 1150° C. A hard, porous, brittle cake was obtained by this method. The cake was then crushed to a screen size of —20 +60.

*Example 7*

From a mass of aniline sludge, sintered and crushed as in Example 6, a charge of 400 grams thereof was mixed with 200 grams of anthracite coal of screen size —20 +80, and 8 grams of rock salt of screen size —20. This charge was placed in a stainless steel drum. A gas vent was provided in the wall of the drum. The drum was rotated for a period of one and one-half hours at a speed of three revolutions per minute in a standard type muffle furnace at a temperature of 975° C. At the end of that time the barrel was cooled quickly with water so that very little reoxidation of the product occurred. The reduced sludge was separated from the residue of coal and ash by passing the mixture near an electro-magnet so that the ferriferous material was drawn out. 295 grams of reduced sludge was obtained, representing a metallization of 97.5%. The ferriferous product exhibited an extended surface in relation to its mass and was highly active as a reduction material.

Although I prefer to use anthracite coal as my reducing agent, as disclosed above, any suitable reducing agent may be used such as crude oil, sawdust, soft coal, coke, graphite, mixtures of kerosene vapors and air, hydrogen, carbon monoxide, and mixtures of such gases, in any proportion.

The ferriferous material produced by the process of my invention has many uses due to its preferred state characterized by an extended surface in relation to its mass, which property renders it highly reactive. The material is of particular value as a reducing agent for organic reactions and especially in the reduction of aromatic nitrocompounds to form their aromatic reduction products in general, such as the primary aromatic amines, or the intermediate products in alkaline solution such as the azo compounds, the azoxy compounds, the hydrazo compounds, and the like. Thus my invention is important in the reduction of nitrobenzene, the nitrotoluenes, nitronaphthalenes, nitroxylenes, nitroanisoles, and nitromesitylenes and other nitroaromatic compounds.

The use of the ferriferous material of my invention in such organic reductions is not claimed in the present application, but is disclosed and claimed in my co-pending application, Serial No. 60,201, filed January 22, 1936.

It is apparent from the general principles of my invention, as described and illustrated above, that it is not to be restricted to the treatment of aniline sludge in particular, but may be as readily applied in treating any sludge containing reducible iron in combined form, and in particular to sludges produced in the analogous reductions of similar aromatic nitrocompounds to form aromatic products such as the ortho- and para-toluidines, the various xylidines, alpha and beta naphthyl amine, the azo, azoxy, and hydrazo compounds, and similar reduction products.

Although I have described my invention in detail and therefore utilized certain specific terms and language herein, it is to be understood that the present disclosure is illustrative rather than restrictive, and that changes and modifications may be resorted to without departing from the spirit or the scope of the claims appended hereto.

I claim:

1. The process for the recovery of iron in an activated form from a sludge containing reducible oxides of iron, which process comprises sintering said sludge, treating said sintered sludge with a suitable reducing agent at a temperature low enough to prevent the sintering of the metal, and immediately cooling at a rate sufficiently rapid to prevent appreciable reoxidation, said reduction being carried out in the presence of a reduction catalyst.

2. The process for the recovery of iron in a state of high surface area from a sludge containing reducible oxides of iron, which process comprises sintering said sludge, and treating said sintered sludge with a suitable reducing agent, at a temperature low enough to prevent the sintering of the metal, said reduction being carried out in the presence of a catalyst comprising at least one compound chosen from the group consisting of the carbonates, chlorides, oxides, and hydroxides of the alkali and alkaline earth metals.

3. The process for the recovery of iron in a state of high surface area from a sludge containing reducible oxides of iron, which process comprises sintering said sludge, reducing said sintered sludge with anthracite coal at a temperature low enough to prevent the sintering of the metal, said reduction process being carried out in the presence of a catalyst comprising at least one compound chosen from the group consisting of the chlorides, carbonates, oxides, and hydroxides of the alkali and alkaline earth metals, and immediately cooling the product at a rate sufficiently rapid to prevent substantial reoxidation, at least a part of said catalyst being added during said reduction step.

4. The process for the recovery of iron in a state of high surface area from a sludge resulting from the reduction of an aromatic nitrocompound to a primary amine by means of iron, which process comprises sintering said sludge, treating said sintered sludge with a reducing agent at a temperature low enough to prevent the sintering of the metal, and immediately cooling the product at a rate sufficiently rapid to prevent substantial reoxidation, said reduction being carried out in the presence of a catalyst, at least a portion of which is added during said sintering step, said catalyst comprising at least one compound of a metal selected from the group consisting of the alkali and alkaline earth metals.

5. The process for the recovery of iron in a state of high surface area from a sludge resulting from the reduction of an aromatic nitrocompound to a primary amine by means of iron, which process comprises sintering said sludge, treating said sintered sludge with a reducing agent at a temperature low enough to prevent the sintering of the metal, said reduction being carried out in the presence of a catalyst, at least a portion of which is added during said sintering stage, said catalyst comprising at least one compound chosen from the group consisting of the chlorides, carbonates, hydroxides, and oxides of the alkali and alkaline earth metals.

6. The process of claim 5, in which said reducing agent comprises anthracite coal.

7. The process of claim 5, in which said catalyst comprises sodium chloride.

8. The process of claim 5, in which said catalyst comprises sodium carbonate.

9. The process for the recovery of iron in a state of high surface area from a sludge resulting from the reduction of nitrobenzene to aniline by means of iron, which process comprises sintering said sludge, treating said sintered sludge with a solid carbonaceous reducing agent at a temperature low enough to prevent the sintering of the metal, said reduction being carried out in the presence of a catalyst, said catalyst comprising at least one compound chosen from the group consisting of the carbonates, chlorides, oxides, and hydroxides of the alkali and alkaline earth metals.

10. The process for the recovery of iron in a state of high surface area from a sludge resulting from the reduction of nitrobenzene to aniline by means of iron, which process comprises sintering said sludge, treating said sintered sludge with a solid carbonaceous reducing agent at a temperature low enough to prevent the sintering of the metal, said reduction being carried out in the presence of a catalyst, at least a portion of which is added during said reduction step, said catalyst comprising at least one compound chosen from the group consisting of the carbonates, chlorides, oxides, and hydroxides of the alkali and alkaline earth metals.

11. The process for the recovery of iron in a state of high surface area from a sludge resulting from the reduction of nitrobenzene to aniline by means of iron, which process comprises sintering said sludge, treating said sintered sludge with a solid carbonaceous reducing agent at a temperature low enough to prevent the sintering of the metal, said reduction being carried out in the presence of a catalyst, at least a portion of which is added during said sintering step, said catalyst comprising at least one compound chosen from the group consisting of the carbonates, chlorides, oxides, and hydroxides of the alkali and alkaline earth metals.

12. The process for the recovery of iron in a state of high surface area from a sludge resulting from the reduction of nitrobenzene to aniline with iron, which process comprises sintering said sludge at a temperature of 1050 to 1200° C., reducing said sintered sludge with anthracite coal at a temperature of 900 to 1000° C., and cooling the product at a rate sufficiently rapid to prevent substantial reoxidation, said reduction being carried out in the presence of sodium chloride as a reduction catalyst, at least a portion of said sodium chloride being added during said sintering step.

13. The process for the recovery of iron in a state of high surface area from finely divided iron oxides, which process comprises sintering said oxides of iron, treating said sintered material with a suitable reducing agent at a temperature low enough to prevent the sintering of the metal, and immediately cooling at a rate sufficiently rapid to prevent appreciable reoxidation, said reduction being carried out in the presence of a catalyst comprising at least one compound chosen from the group consisting of the carbonates, chlorides, oxides and hydroxides of the alkali and alkaline earth metals, at least a portion of said catalyst being present during said sintering step.

14. The process for the recovery of activated iron from finely divided iron oxides, which process comprises sintering said oxides of iron, treating said sintered material with a suitable reducing agent at a temperature low enough to prevent the sintering of the metal, and immediately cooling at a rate sufficiently rapid to prevent appreciable reoxidation, said reduction being carried out in the presence of a catalyst comprising at least one compound chosen from the group consisting of the chlorides of the alkali and alkaline earth metals.

15. The process for the recovery of activated iron from finely divided iron oxides, which process comprises sintering said oxides of iron, treating said sintered material with a suitable reducing agent at a temperature low enough to prevent the sintering of the metal, and immediately cooling at a rate sufficiently rapid to prevent appreciable reoxidation, said reduction being carried out in the presence of a catalyst comprising at least one compound chosen from the group consisting of the chlorides of the alkali and alkaline earth metals, at least a portion of said catalyst being present during the sintering step.

MARSHALL F. ACKEN.